United States Patent [19]

McRowe

[11] 4,216,139
[45] Aug. 5, 1980

[54] VINYL CHLORIDE POLYMERS CONTAINING COPPER OXALATE

[75] Inventor: Arthur W. McRowe, Akron, Ohio

[73] Assignee: The B. F. Goodrich Company, Akron, Ohio

[21] Appl. No.: 969,643

[22] Filed: Dec. 13, 1978

Related U.S. Application Data

[63] Continuation-in-part of Ser. No. 648,277, Jan. 12, 1973, abandoned, and a continuation of Ser. No. 833,865, Nov. 16, 1977, abandoned.

[51] Int. Cl.$^2$ ............................................... C08K 5/09
[52] U.S. Cl. ........................... 260/45.75 C; 260/42.49
[58] Field of Search ...................... 260/42.49, 45.75 C, 260/DIG. 43; 526/4

[56] References Cited

U.S. PATENT DOCUMENTS 3,821,151  6/1974  Mitchell ........................... 260/42.22

Primary Examiner—V. P. Hoke
Attorney, Agent, or Firm—J. Hughes Powell, Jr.

[57] ABSTRACT

Vinyl chloride polymers containing copper oxalate have improved flame resistance and reduced smoke production.

5 Claims, No Drawings

VINYL CHLORIDE POLYMERS CONTAINING COPPER OXALATE

CROSS REFERENCE TO RELATED APPLICATION

This is a continuation-in-part of copending application Ser. No. 648,277, filed Jan. 12, 1976, abandoned and a continuation of copending application Ser. No. 833,865, filed Nov. 16, 1977, abandoned.

BACKGROUND OF THE INVENTION

Presently there is need for improved plastic products which are safer in fire situations, even for vinyl chloride polymers which generally are considered to be flame resistant. While rigid vinyl chloride products have many structural applications useful in buildings and transportation vehicles, many used are also made of plasticized vinyl chloride polymers as in fabrics, upholstery, wall coverings and the like where flame resistance and smoke formation could be a problem. Government and safety regulations relating to such materials are now in effect. Not only is flame resistance to be reduced in such materials as vinyl chloride plastic products, but smoke generated by vinyl chloride polymer products in fires also must be reduced. The NBS smoke chamber is accepted as a measure of smoke generated. A number of materials have been proposed and used in vinyl chloride for this purpose, but very few have been found to be completely satisfactory. Many are not compatible or readily mixed with vinyl chloride polymers, many are colored or form colored products in vinyl chloride polymer compositions and many have adverse effects on the physical properties of vinyl chloride polymers.

U.S. Pat. No. 3,845,001 discloses the use of copper compounds alone, such as $Cu_2O$ or mixtures of $MoO_3$ and $Cu_2O$ that reduce smoke production during combustion. This patent also states that "the applicability of such oxides suggests the use of other compounds" such as acetyl acetonylacetates and copper salts of carboxylic acids such as the acetates and butyrates. While cuprous oxide is satisfactory in reducing the smoke produced during the combustion of polyvinyl chloride, it results in an undesirable red color in the compounds. This coloration problem is particularly acute with the tin sulfur stabilizers used widely throughout the industry. The copper carboxylates suggested are generally unsatisfactory from other viewpoints than smoke reduction, for example, cupric formate during milling into polyvinyl chloride causes discoloration and black spots. Copper acetylacetonte causes discoloration during processing, which discoloration continues to develop undesirably on heating.

U.S. Pat. No. 3,821,151 discloses polyvinyl halides compounded with a mixture of iron powder and copper oxide and/or molybdenum oxide. Cuprous oxide is the preferred copper oxide. While amounts as low as 1 weight part are suggested, exemplary compositions contain 50 cupric oxide, 50 iron oxide, 20 iron powder, 40 cuprous oxide, and 40 molybdenum trioxide and 24 to 75 parts by weight of iron powder with cuprous oxide or molybdenum oxide and even 10 to 80 parts by weight of each. However, iron powder is an undesirable additive in many vinyl halide polymer compositions.

SUMMARY OF THE INVENTION

Copper oxalate is a very effective fire and smoke retardant in vinyl chloride polymer composition. The copper oxalate is compatible and easily mixed with vinyl chloride polymers in both rigid and flexible forms, does not form objectionable color products in vinyl chloride polymers and has no adverse effects on the physical properties or processing of compounds containing it.

DETAILED DESCRIPTION

The copper oxalate is normally used in powder form in amounts greater than about 0.01 part per 100 weight parts of vinyl chloride polymer, more preferably from 0.1 to about 20 weight parts per 100 weight parts of vinyl chloride polymer. From about 1 to about 10 weight parts is a very practical range providing a good balance of desirable properties in the compounds. The copper oxalate is readily mixed with the vinyl chloride polymers in powder form as is any other powder ingredient mixed with vinyl chloride polymers as is well known to those skilled in the art.

Cupric oxalate is readily prepared by mixing stoichiometric amounts of hot concentrated solutions of cupric sulfate and oxalic acid. The precipitate is filtered and may be dried in vacuum or at 100° C. and atmospheric pressure.

The vinyl chloride polymers include those vinyl chloride polymers that are homopolymers, that is, polyvinyl chloride, as well as those copolymers containing vinyl chloride and up to about 50%, more usually about 30% by weight of at least one other vinylidene monomer containing at least one terminal $CH_2\uparrow C<$ group such as vinylidene chloride, alkyl acrylates and methacrylates wherein the alkyl group contains 1 to 10 carbon atoms, acrylic acids, amides and nitriles thereof such as acylic acid, ethacrylic acid, acrylamides, N-methylol methacrylamide, acrylonitrile, methacrylonitrile and the like, α-olefins containing 2 to 6 atoms such as ethylene and propylene, vinyl esters such as vinyl acetate, vinyl butyrate, vinyl benzoate, vinyl aromatics such as styrene, chlorostyrene, ethyl styrene, vinyl naphthalene, vinyl alkyl ethers, vinyl ketones, chlorinated vinyl chloride polymers; and blends of vinyl chloride polymers with other polymers, both plastics and elastomers, for example, with ABS resins, with 10 to 40% of copolymers of styrene and acrylonitrile or styrene and methyl methacrylate wherein styrene is the major component, elastomers containing about equal amounts of styrene and acrylonitrile with butadiene, polyurethanes, nitrile elastomers, both liquid and solid containing from about 15 to 40% acrylonitrile with the remainder butadiene, polyolefins and the like. These vinyl chloride polymers normally are high molecular weight polymers having a specific viscosity greater than 0.4 measured as a 0.4% solution in nitrobenzene.

The vinyl chloride polymers will be mixed with standard compounding ingredients known to those skilled in the art, plasticizers, lubricants, stabilizers, fillers, colorants, processing aids, other flame and smoke retardants, and the like. While these compounds are most effective in vinyl chloride polymers substantially free of plasticizers subject to burning, they provide improved compositions as to flame propagation and smoke when plasticizers are present.

However, iron powder is an undesirable additive in many vinyl halide polymer compositions. For example, it is black and will discolor such compositions. Further, iron powders can contribute to degradation and discoloration of the polymer. The presence of iron powder introduces other processing problems. If the iron powder particles are too large or irregularly shaped they may erode and wear die and screw surfaces undesirably. If the iron powder is very fine, it may oxidize and result in premature degradation of the polymer during processing and thereafter result in lower dynamic thermal stability. Iron powder also will adversely affect the electrical properties of vinyl chloride polymer compositions, for example, when used in wire insulation and coatings which are major applications for vinyl chloride polymers. Even small amounts of iron powder will adversely affect insulation resistance, dielectric constant, magnetic susceptibility, and the like. If iron powder is present in the composition it should be present in amount less than the amount sufficient to cause the undesirable side effects discussed above. For example, less than 1 weight percent, preferably less than 1 weight part of iron powder per 99 weight parts of copper oxalate and more preferably, the compounds should be substantially free of iron powder, that is, less than 0.01 weight percent, as less than 0.005.

In the following Examples, there is reported the $D_m/g$, maximum optical density/gram of sample observed with a vertical light path in the Nation Bureau of Smoke Chamber (NBS) and % smoke reduction. $D_m$ is maximum optical density according to Gross. The NBS smoke chamber and its use are described by Gross et al in fire test methods ASTM STP 422, 1967, Pates 166–206. The NBS $D_m/g$. smoke numbers reported are in the flaming mode.

EXAMPLE I

A vinyl chloride polymer compound was prepared by mixing 100 weight parts of polyvinyl chloride having a specific viscosity of 0.38–0.42 in nitrobenzene at 30° C. with 2 weight parts of polyethylene having a specific gravity of 0.924 g/cc and melt index of 5 g/10 minutes, and the amounts of copper oxalate shown in the data table below as Phr of polyvinyl chloride. The ingredients were all dry blended, milled at 325° F., press molded at 350° F. for 3 minutes to 25 mil sheets. 3×3 inch samples were tested in the flaming mode in the NBS smoke chamber.

| Parts CuC$_2$O$_4$.$\frac{1}{2}$H$_2$O | $D_m/g$ | % Smoke Reduction |
| --- | --- | --- |
| 0 | 65 | — |
| 0.5 | 37.8 | 42 |
| 2.0 | 16.2 | 75 |
| 5.0 | 12.0 | 82 |

EXAMPLE II

In another composition, to demonstrate the unexpected advantages of copper oxalate in polyvinyl chloride compounds, compounds containing 100 weight parts of the polyvinyl chloride of Example I, 2 weight parts of dibutyltinbis isooctyladithioglycolate, 4 weight parts of methyl methacrylate processing aid having a Brookfield viscosity in 10% toluene solution of 200–100 cps., 3 weight parts of titanium dioxide, 1 weight part of calcium stearate, and 1 weight part of ethylenebisstearamide were mixed with from 0.5 to 10 weight parts of copper oxalate by milling and molding as described above to produce 6"×6"×0.025" test sheets. There was no discoloraion observed up to about the 5 weight parts level, and at 5 to 10 weight parts there was only a pale bluish-green cast to the compounds. In contrast, cupric hexanote and cupric acetate gave very strong dark discoloration at level as low as 1 weight part. Cupric stearate could not be incorporated into the compound at levels above 2.5 weight parts because of excessive lubrication and even at 1 weight part level the compound turned a dark tan as compard to no discoloration with 2.5 weight parts of copper oxalate. In NBS smoke chamber tests the cupric oxalate was more effective on an equal weight basis than many of these carboxylates as is shown in the data below and did not have the disadvantage of discoloration. Further, other processing problems are introduced when these copper carboxylates are used in addition to loss of physical properties of the resulting polyvinyl chloride compound.

| Flaming Mode NBS Smoke Chamber Data | | | | |
| --- | --- | --- | --- | --- |
| Cupric Oxalate phr | | $D_m/g$ | $D_m$ | No. of Measurements | % Smoke Reduction |
| -0- | control | 55.5 | 290 | 8 | -0- |
| 0.5 | | 38.3 | 191 | 6 | 31.0 |
| 1.0 | | 33.4 | 184 | 6 | 39.8 |
| 2.5 | | 29.3 | 145 | 6 | 47.2 |
| 5.0 | | 27.6 | 152 | 6 | 50.3 |
| 10.0 | | 19.9 | 117 | 6 | 64.1 |
| 1.0 | cupric stearate | 42.1 | | 6 | 24.1 |
| 1.0 | cupric acetate | 42.3 | | 6 | 23.8 |
| 2.5 | | 34.7 | | 6 | 37.5 |
| 5.0 | | 30.2 | | 6 | 45.6 |

EXAMPLE III

To demonstrate the unexpected difference in the effectiveness of different copper compounds in the absence of iron powder, a series of polyvinyl chloride compounds were prepared to determine the dynamic thermal stability of polyvinyl chloride compounds containing other copper compound additives. These compounds were prepared from a base recipe of 100 weight parts of polyvinyl chloride, having a specific viscosity of 0.38–0.42 in nitrobenzene at 30° C.; 2 weight parts of isooctyltindithioglycolate; 4 weight parts of a processing aid of a copolymer of a major proportion of methyl methacrylate and lesser amounts of ethyl acrylate, having a Brookfield viscosity in a 10% toluene solution of 200–1,000 cps; 3.0 weight parts of titanium dioxide; 1 weight part of calcium stearate and 1 weight part of ethylenebisstearamide. To this basic recipe there was added in different batches varying amounts of copper compound as set forth hereinbelow. The compounds were powder mixed and tested for processing stability in a C. W. Brabender Plasticorder equipped with a R.E.O.-6 roller mixing head heated with circulating oil at 194° C. The mixtures were run at 50 rpm, and in the case of the control, was charged in amounts of 55 grams of powder mix compound; in the case of compounds containing the copper materials, 52.6 grams of the powder mix and 2.4 grams of the copper additive. The mixer was run until the powders fused, at which time the maximum torque values leveled out, changing slowly to a minimum just before the onset of drastic decomposition; the time to this failure and the temperature and torque at this point are set forth in the data table hereinbelow:

| Copper Additive | Failure Time (minutes) | Torque (m. − g.) | Temp. (°C.) |
| --- | --- | --- | --- |
| None | 18.5 ± 0.9 | 2900 | 204 |
| Copper oxalate | 16.9 ± 0.3 | 2900 | 205 |
| Copper (II) acetylacetonate | 11.7 ± 1.7 | 3050 | 207 |
| Cupric oxide | 10.7 | 3150 | 205 |
| Cuprous oxide | 10.8 | 3025 | 205 |
| Copper formate | 8.8 | 3325 | 208 |
| Copper acetate | 5.2 | 3500 | 208 |
| Copper sulfide | 4.0 | 3500 | 200 |
| Copper sulfate | Failed during fusion | — | |

I claim:

1. A composition comprising a vinyl chloride polymer and copper oxalate in amounts from about 0.01 to about 20 weight parts per 100 weight parts of vinyl chloride polymer and less than 0.005 weight percent of iron powder based on the weight of said composition and a ratio of less than one weight part of iron powder per 99 weight parts of copper oxalate.

2. A composition of claim 1 wherein the vinyl chloride polymer contains up to about 50% by weight of at least one vinylidene compound copolymerized therewith having a terminal $CH_2=C<$ group.

3. A composition of claim 1 wherein there is about 1 to 10 weight parts of cupric oxalate and being substantially free of iron powder.

4. A composition of claim 2 wherein there is about 1 to 10 weight parts of cupric oxalate and being substantially free of iron powder.

5. A composition of claim 1 wherein the vinyl chloride polymer is poly(vinyl chloride).

* * * * *